United States Patent
Shie et al.

(10) Patent No.: US 12,493,233 B2
(45) Date of Patent: Dec. 9, 2025

(54) PROJECTION APPARATUS

(71) Applicant: Coretronic Corporation, Hsin-Chu (TW)

(72) Inventors: Jen-Yu Shie, Hsin-Chu (TW); Kuang-Hsiang Chang, Hsin-Chu (TW); Hung-Pin Chen, Hsin-Chu (TW); Heng Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 533 days.

(21) Appl. No.: 18/089,606

(22) Filed: Dec. 28, 2022

(65) Prior Publication Data

US 2023/0213844 A1  Jul. 6, 2023

(30) Foreign Application Priority Data

Dec. 31, 2021  (CN) .......................... 202111661895.X

(51) Int. Cl.
*G03B 21/14* (2006.01)
*G02B 5/04* (2006.01)
(Continued)

(52) U.S. Cl.
CPC ............. *G03B 21/142* (2013.01); *G02B 5/04* (2013.01); *G03B 21/28* (2013.01); *H04N 9/317* (2013.01); *H04N 9/3197* (2013.01)

(58) Field of Classification Search
CPC .......... H04N 9/005; H04N 9/006; H04N 9/28; H04N 9/142; H04N 9/317; H04N 9/3141;
(Continued)

(56) References Cited

U.S. PATENT DOCUMENTS 4,701,591 A  10/1987  Masaki et al.
5,948,291 A   9/1999  Neylan et al.
(Continued)

FOREIGN PATENT DOCUMENTS

CN   2375974    4/2000
CN  101169517   4/2008
(Continued)

OTHER PUBLICATIONS

"Office Action of China Counterpart Application", issued on Aug. 7, 2025, p. 1-p. 10.

*Primary Examiner* — Sultan Chowdhury
(74) *Attorney, Agent, or Firm* — JCIPRNET

(57) ABSTRACT

A projection apparatus, including an illumination system, a light valve, a first movable reflector, a first projection lens, a second projection lens, and a driving module, is provided. The illumination system is configured to provide an illumination light beam. The driving module is connected to the first movable reflector and is configured to drive the first movable reflector to move. The projection apparatus has a first projection mode and a second projection mode for being performed. In the first projection mode, the driving module controls the first movable reflector to move to a first position. In the second projection mode, the driving module controls the first movable reflector to move to a second position, and the first movable reflector is not located on a transmission path of an image light beam.

12 Claims, 8 Drawing Sheets

(51) Int. Cl.
*G03B 21/28* (2006.01)
*H04N 9/31* (2006.01)

(58) Field of Classification Search
CPC .......... H04N 9/3197; G02B 5/00; G02B 5/04; G02B 26/0816; G02B 26/0833; G02B 26/085; G03B 21/28; G03B 21/142; G03B 21/145; G03B 21/2053; G03B 21/2066
See application file for complete search history.

(56) References Cited

U.S. PATENT DOCUMENTS

| | | | | |
|---|---|---|---|---|
| 2008/0074625 | A1* | 3/2008 | Lai ........................ | G03B 21/28 |
| | | | | 353/82 |
| 2010/0182516 | A1* | 7/2010 | Chen .................... | H04N 9/3141 |
| | | | | 348/744 |
| 2012/0206697 | A1* | 8/2012 | Lee ....................... | G03B 21/28 |
| | | | | 353/82 |

FOREIGN PATENT DOCUMENTS

| | | |
|---|---|---|
| CN | 106444244 | 2/2017 |
| CN | 113504696 | 10/2021 |
| JP | 2012094332 | 5/2012 |
| TW | 201028786 | 8/2010 |
| TW | 201111897 | 4/2011 |

* cited by examiner

PROJECTION APPARATUS

CROSS-REFERENCE TO RELATED APPLICATION

This application claims the priority benefit of China application serial no. 202111661895.X, filed on Dec. 31, 2021. The entirety of the above-mentioned patent application is hereby incorporated by reference herein and made a part of this specification.

BACKGROUND

Technical Field

The disclosure relates to a projection apparatus for projecting images toward different directions.

Description of Related Art

Nowadays, the mainstream of the projector system is to use a single lens for projection. If a projector needs to perform projection transformation in different directions, it is required to move the projector or use an external mechanism to adjust the projection direction. That is to say, an existing projector has the following issues. The projector needs to adjust the position of the entire projector through the external force or the external mechanism to change the projection direction. In addition, the existing projector is confined to the focal length of a single lens and cannot be adjusted according to the field of use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus, which may provide projection effects in different directions without moving a projection system or relying on an external mechanism.

Other objectives and advantages of the disclosure can be further understood from the technical features disclosed by the disclosure.

To achieve one, a part, or all of the foregoing objectives or other objectives, an embodiment of the disclosure provides a projection apparatus, which includes an illumination system, a light valve, a first movable reflector, a first projection lens, a second projection lens, and a driving module. The illumination system is configured to provide an illumination light beam. The light valve is disposed on a transmission path of the illumination light beam and is configured to convert the illumination light beam into an image light beam. The first projection lens and the second projection lens are disposed on a transmission path of the image light beam and are configured to project the image light beam out of the projection apparatus. The driving module is connected to the first movable reflector and is configured to drive the first movable reflector to move. The projection apparatus has a first projection mode and a second projection mode for being executed. In the first projection mode, the driving module is configured to control the first movable reflector to move to a first position, and the image light beam is transmitted from the light valve to the first movable reflector, the image light beam is reflected to the first projection lens by the first movable reflector, and is projected out of the projection apparatus. In the second projection mode, the driving module is configured to control the first movable reflector to move to a second position, the first movable reflector is not located on the transmission path of the image light beam, and the image light beam is transmitted from the light valve to the second projection lens and is projected out of the projection apparatus.

In an embodiment of the disclosure, the projection apparatus further includes a first stopper and a second stopper. The first stopper is configured to fix the first movable reflector on the first position. The second stopper is configured to fix the first movable reflector on the second position.

In an embodiment of the disclosure, the first movable reflector is driven to rotate around a first rotation axis through the driving module, the first movable reflector is located on the first position in the first projection mode and is located on the second position in the second projection mode.

In an embodiment of the disclosure, the projection apparatus further includes a control unit. The control unit is electrically connected to the illumination system and is configured to control the illumination system to emit the illumination light beam. In the first projection mode, when the first movable reflector is not yet located on the first position, the control unit closes the illumination system. In the second projection mode, when the first movable reflector is not yet located on the second position, the control unit closes the illumination system.

In an embodiment of the disclosure, the control unit is further electrically connected to the driving module and controls the first movable reflector to rotate around the first rotation axis through the driving module.

In an embodiment of the disclosure, the projection apparatus further includes a first position sensing element and a second position sensing element. The first position sensing element and the second position sensing element are respectively electrically connected to the control unit and are configured to detect a position of the first movable reflector.

In an embodiment of the disclosure, the projection apparatus further includes the control unit, a second movable reflector, and a third projection lens. The control unit is electrically connected to the illumination system and is configured to control the illumination system to emit the illumination light beam. The projection apparatus further has a third projection mode for being performed. In the second projection mode, the driving module controls the second movable reflector to move to a third position, and the second movable reflector is not located on the transmission path of the image light beam. In the third projection mode, the driving module controls the first movable reflector to move to the second position, the first movable reflector is not located on the transmission path of the image light beam, the driving module controls the second movable reflector to move to a fourth position, and the image light beam is transmitted from the light valve to the second movable reflector, the image light beam is reflected to the third projection lens by the second movable reflector, and is projected out of the projection apparatus.

In an embodiment of the disclosure, the projection apparatus further includes a third stopper and a fourth stopper. The third stopper is configured to fix the second movable reflector on the third position. The fourth stopper is configured to fix the second movable reflector on the fourth position.

In an embodiment of the disclosure, the driving module is further connected to the second movable reflector. The second movable reflector is driven to rotate around a second rotation axis through the driving module, the second movable reflector is located on the third position in the second projection mode and is located on the fourth position in the third projection mode.

In an embodiment of the disclosure, the control unit is electrically connected to the driving module and controls the second movable reflector to rotate around the second rotation axis through the driving module.

In an embodiment of the disclosure, in the second projection mode, when the second movable reflector is not yet located on the third position, the control unit closes the illumination system. In the third projection mode, when the second movable reflector is not yet located on the fourth position, the control unit closes the illumination system.

In an embodiment of the disclosure, the projection apparatus further includes a third position sensing element and a fourth position sensing element. The third position sensing element and the fourth position sensing element are respectively electrically connected to the control unit and are configured to detect a position of the second movable reflector.

In an embodiment of the disclosure, the projection apparatus further includes a reflection prism disposed between the illumination system and the light valve on the transmission path of the illumination light beam. The illumination light beam passes through the reflection prism and is transmitted to the light valve. The image light beam enters the reflection prism and is reflected to the first projection lens or the second projection lens by the reflection prism.

Based on the above, in an embodiment of the disclosure, the projection apparatus drives the first movable reflector to move through the driving module, so that the image light beam is projected out of the projection apparatus from the first projection lens or the second projection lens. Therefore, different projection lenses may be switched with the movable reflector, thereby achieving projection in different directions without moving the projection apparatus or relying on the external mechanism.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWING

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
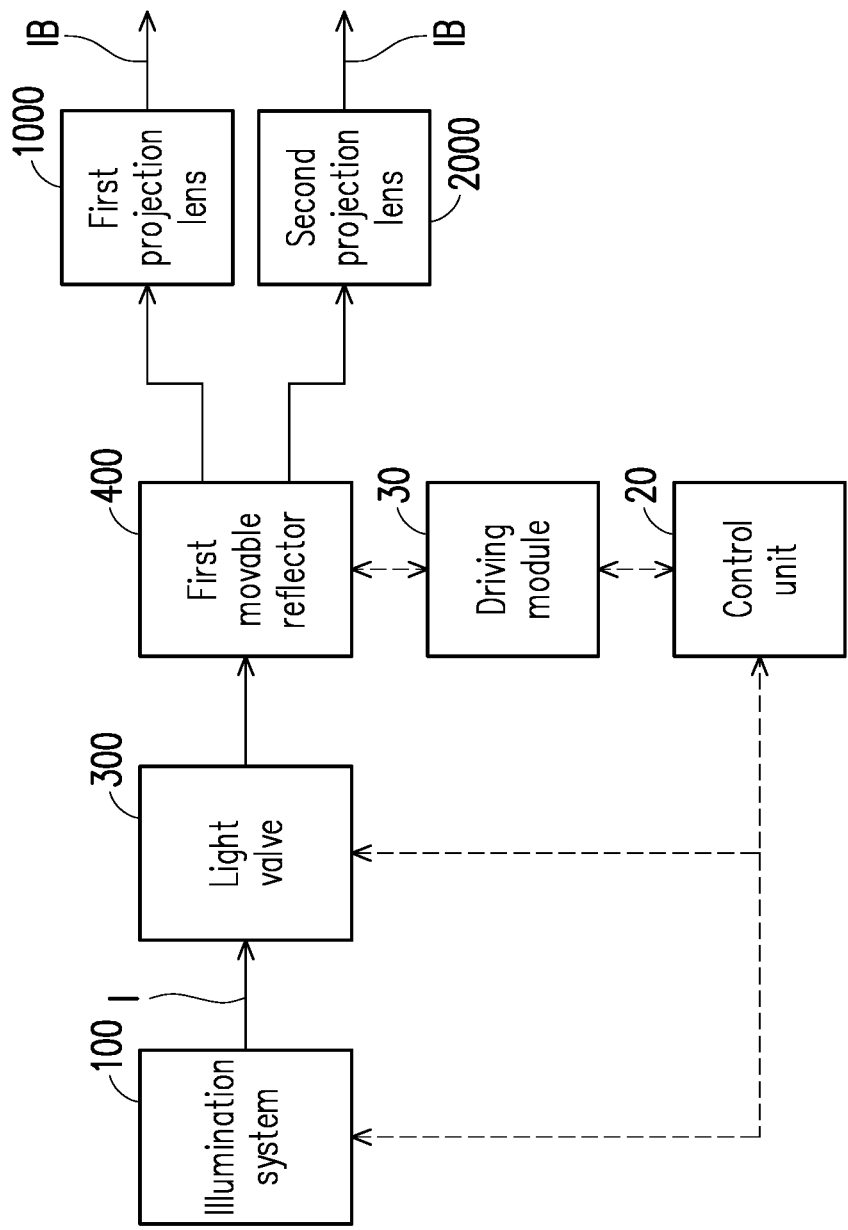
FIG. 1 is a block diagram of a projection apparatus according to an embodiment of the disclosure.
Figure 2:
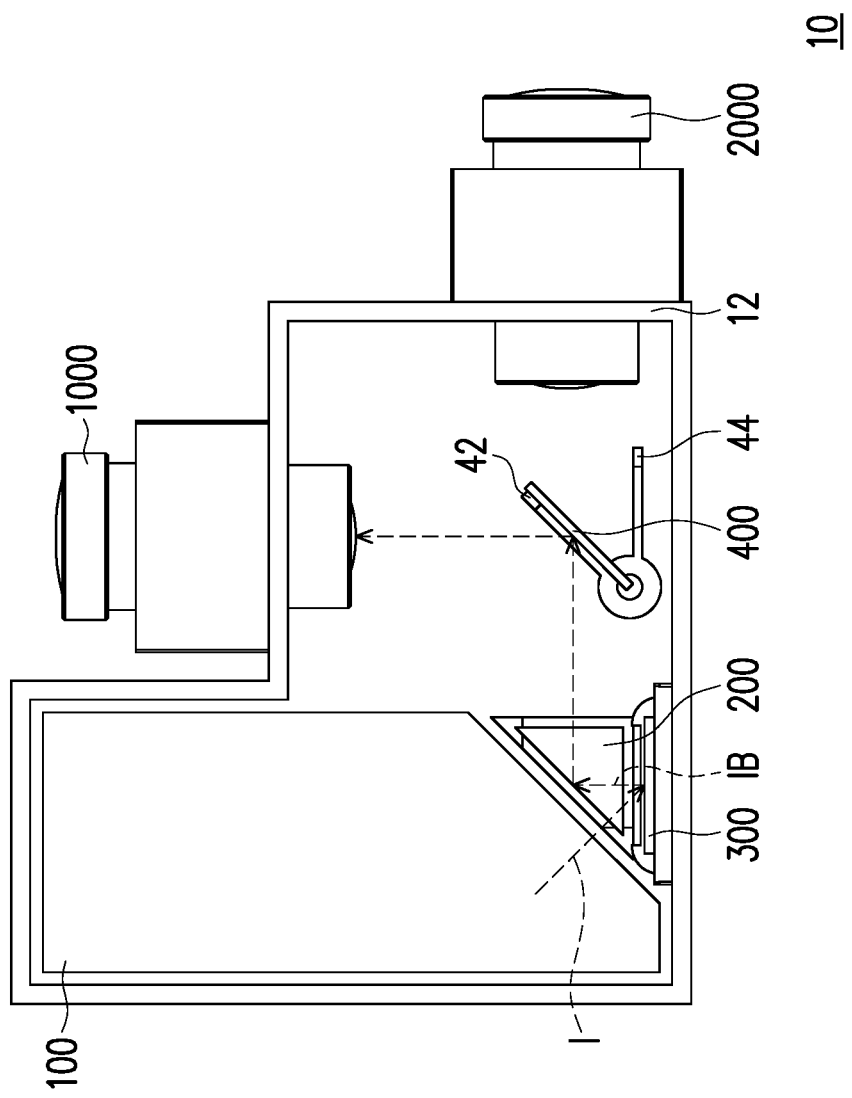
FIG. 2 is a schematic view illustrating a projection apparatus in a first projection mode according to a first embodiment of the disclosure.
Figure 3:
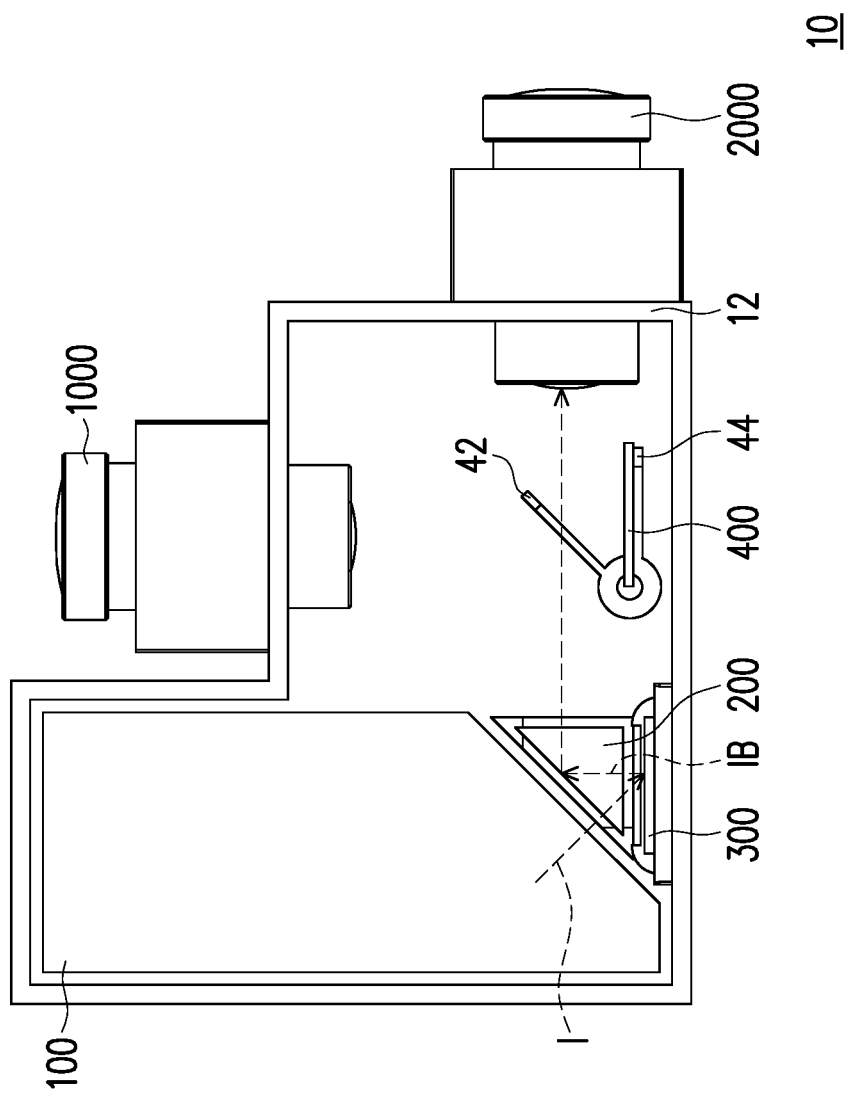
FIG. 3 is a schematic view illustrating the projection apparatus in a second projection mode according to the first embodiment of the disclosure.

FIG. 1 is a block diagram of a projection apparatus according to an embodiment of the disclosure. FIG. 2 is a schematic view illustrating a projection apparatus in a first projection mode according to a first embodiment of the disclosure. FIG. 3 is a schematic view illustrating the projection apparatus in a second projection mode according to the first embodiment of the disclosure. Referring to FIG.

1, FIG. 2, and FIG. 3, an embodiment of the disclosure provides a projection apparatus 10 including an illumination system 100, a light valve 300, a first movable reflector 400, a first projection lens 1000, a second projection lens 2000, and a driving module 30. The illumination system 100 is configured to provide an illumination light beam I. The light valve 300 is disposed on a transmission path of the illumination light beam I and is configured to convert the illumination light beam I into an image light beam IB. When the image light beam IB is transmitted from the light valve 300 to the first projection lens 1000, the first projection lens 1000 is disposed on a transmission path of the image light beam IB and is configured to project the image light beam IB out of the projection apparatus 10. When the image light beam IB is transmitted from the light valve 300 to the second projection lens 2000, the second projection lens 2000 is disposed on the transmission path of the image light beam IB and is configured to project the image light beam IB out of the projection apparatus 10. It should be noted that, for convenience of description, FIG. 2 and FIG. 3 do not show an upper cover of a shell 12 of the projection apparatus 10.

Specifically, the illumination light beam I emitted by the illumination system 100 in the embodiment is, for example, a light beam emitted by a light source through a light homogenizing element. The light source is, for example, a laser diode (LD), a light emitting diode (LED), other suitable light sources, or a combination thereof. The light homogenizing element is, for example, an integration rod, a lens element array such as a fly-eye lens array, or other optical elements with light homogenization effect, but the disclosure is not limited thereto. The light valve 300 is, for example, a digital micro-mirror device (DMD), a liquid-crystal-on-silicon panel (LCOS panel), a liquid crystal panel, or other spatial light modulators. Moreover, the projection lenses 1000 and 2000 are, for example, a combination of one or more optical lenses with diopter. The optical lens includes, for example, various combinations of non-planar lens, such as a biconcave lens element, a biconvex lens element, a concave-convex lens element, a convex-concave lens element, a plano-convex lens element, and a plano-concave lens element. The configuration and the type of the projection lenses 1000 and 2000 are not limited thereto.

In the embodiment, the driving module 30 is connected and electrically connected to the first movable reflector 400 and is configured to drive the first movable reflector 400 to move/rotate. The driving module 30 is, for example, a solenoid valve or a stepping motor with a driving program and is controlled by a signal provided by a control unit 20. Alternatively, the driving module 30 is, for example, a mechanical component such as a rotating shaft or a lever, which enables a user to manually control the first movable reflector 400 through the driving module 30.

In the embodiment, the projection apparatus 10 may perform a first projection mode and a second projection mode. As shown in FIG. 2, in the first projection mode, the first movable reflector 400 is controlled by the driving module 30 to move to a first position. The image light beam IB is transmitted from the light valve 300 to the first movable reflector 400 and is reflected to the first projection lens 1000 by the first movable reflector 400, and is then projected out of the projection apparatus 10. The first movable reflector 400 may include a reflect mirror. As shown in FIG. 3, in the second projection mode, the first movable reflector 400 is controlled by the driving module 30 to move to a second position, so that the first movable reflector 400 is not located on the transmission path of the image light beam IB. The image light beam IB is transmitted from the light valve 300 to the second projection lens 2000 and is then projected out of the projection apparatus 10.

Figure 4:
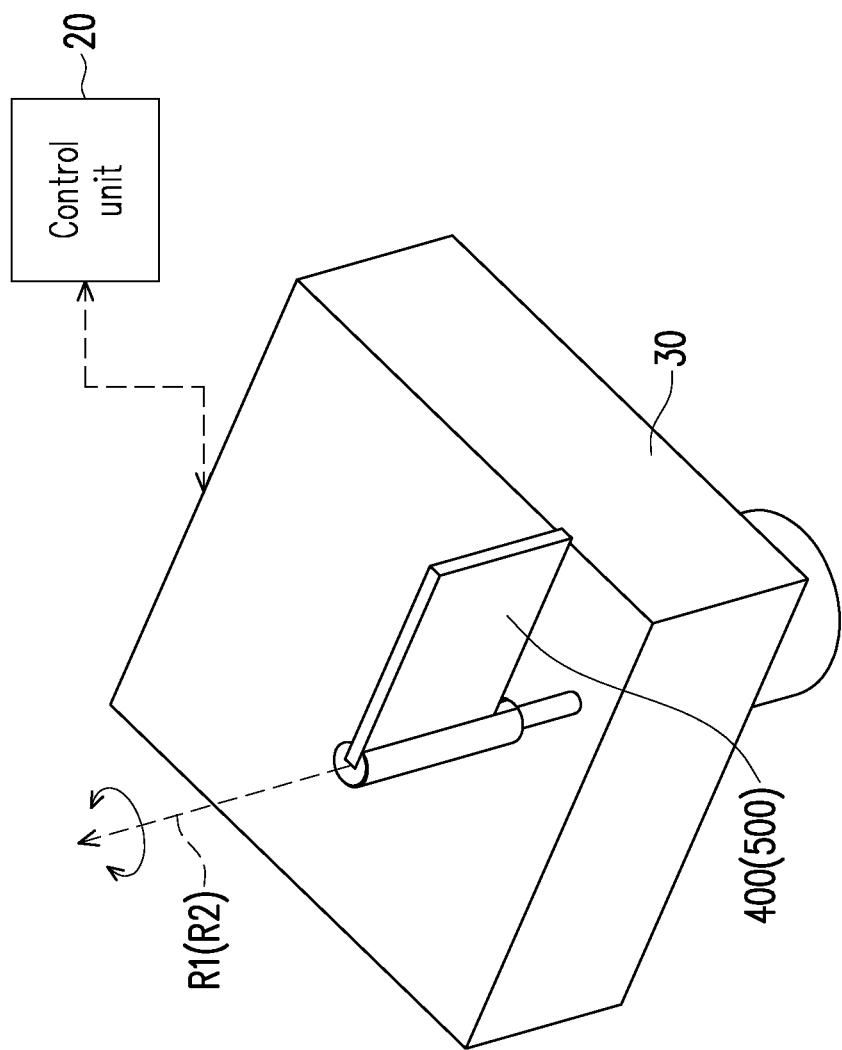
FIG. 4 is a schematic view illustrating a driving module driving a first movable reflector to rotate around a first rotation axis or driving a second movable reflector to rotate around a second rotation axis.

FIG. 4 is a schematic view illustrating a driving module driving the first movable reflector to rotate around a first rotation axis or driving a second movable reflector to rotate around a second rotation axis. Referring to FIG. 4, in the embodiment, the driving module 30 is controlled by the signal provided by the control unit 20, and the first movable reflector 400 is driven to rotate around a first rotation axis R1 through the driving module 30, so that the first movable reflector 400 is located on the first position in the first projection mode and on the second position in the second projection mode.

Referring to FIG. 2 and FIG. 3 again. In the embodiment, the projection apparatus 10 further includes a first stopper 42 and a second stopper 44. The first stopper 42 is configured to fix the first movable reflector 400 on the first position. The second stopper 44 is configured to fix the first movable reflector 400 on the second position. In an embodiment, the first stopper 42 and the second stopper 44 are transparent, which may not affect the transmission of the image light beam IB.

Referring to FIG. 1 to FIG. 4 again. In the embodiment, the projection apparatus 10 further includes the control unit 20. The control unit 20 is electrically connected to the illumination system 100 and is configured to control the illumination system 100 to emit the illumination light beam I. The control unit 20 may switch the projection apparatus 10 to perform one of the first projection mode and the second projection mode. In the first projection mode, when the first movable reflector 400 is not yet located on the first position, the control unit 20 closes the illumination system 100. In the second projection mode, when the first movable reflector 400 is not yet located on the second position, the control unit 20 closes the illumination system 100. Since the projection apparatus 10 uses the control unit 20 to control the illumination system 100 to close the light source, then switches one of the first projection mode and the second projection mode, and further controls the movement of the first movable reflector 400, the situation of incomplete image display may be avoided.

In the embodiment, the control unit 20 is further electrically connected to the driving module 30. The control unit 20 controls the first movable reflector 400 to rotate around the first rotation axis R1 through the driving module 30.

In addition, the control unit 20 includes, for example, a microcontroller unit (MCU), a central processing unit (CPU), a microprocessor, a digital signal processor (DSP), a programmable controller, a programmable logic device (PLD), other similar devices, or a combination thereof, but the disclosure is not limited thereto. Furthermore, in an embodiment, each function of the control unit 20 may be implemented as multiple program codes. The program codes are stored in a memory and are performed by the control unit 20. Alternatively, in an embodiment, each function of the control unit 20 may be implemented as one or more circuits. The implementation of each function of the control unit 20 is not limited to the use of software or hardware in the disclosure.

In the embodiment, the projection apparatus 10 further includes a reflection prism 200. The reflection prism 200 is, for example, a total internal reflection prism (TIR prism). On the transmission path of the illumination light beam I, the reflection prism 200 is disposed between the illumination system 100 and the light valve 300. The illumination light beam I passes through the reflection prism 200 and is then transmitted to the light valve 300. The light valve 300 generates and reflects the image light beam IB, and the image light beam IB is transmitted to the reflection prism 200 and is then reflected to the first projection lens 1000 or the second projection lens 2000 by the reflection prism 200.

In the embodiment, the projection apparatus 10 further includes the shell 12. The illumination system 100, the reflection prism 200, the light valve 300, the first movable reflector 400, the control unit 20, and the driving module 30 are all disposed within the shell 12. The first projection lens 1000 and the second projection lens 2000 are connected to the shell 12 and are embedded in the shell 12. In an embodiment, the driving module 30 may be embedded in the shell 12. For example, the driving module 30 is a manual element such as a rotating shaft or a lever. The first stopper 42 and the second stopper 44 may also be fixed on a surface of the shell 12.

Figure 5:
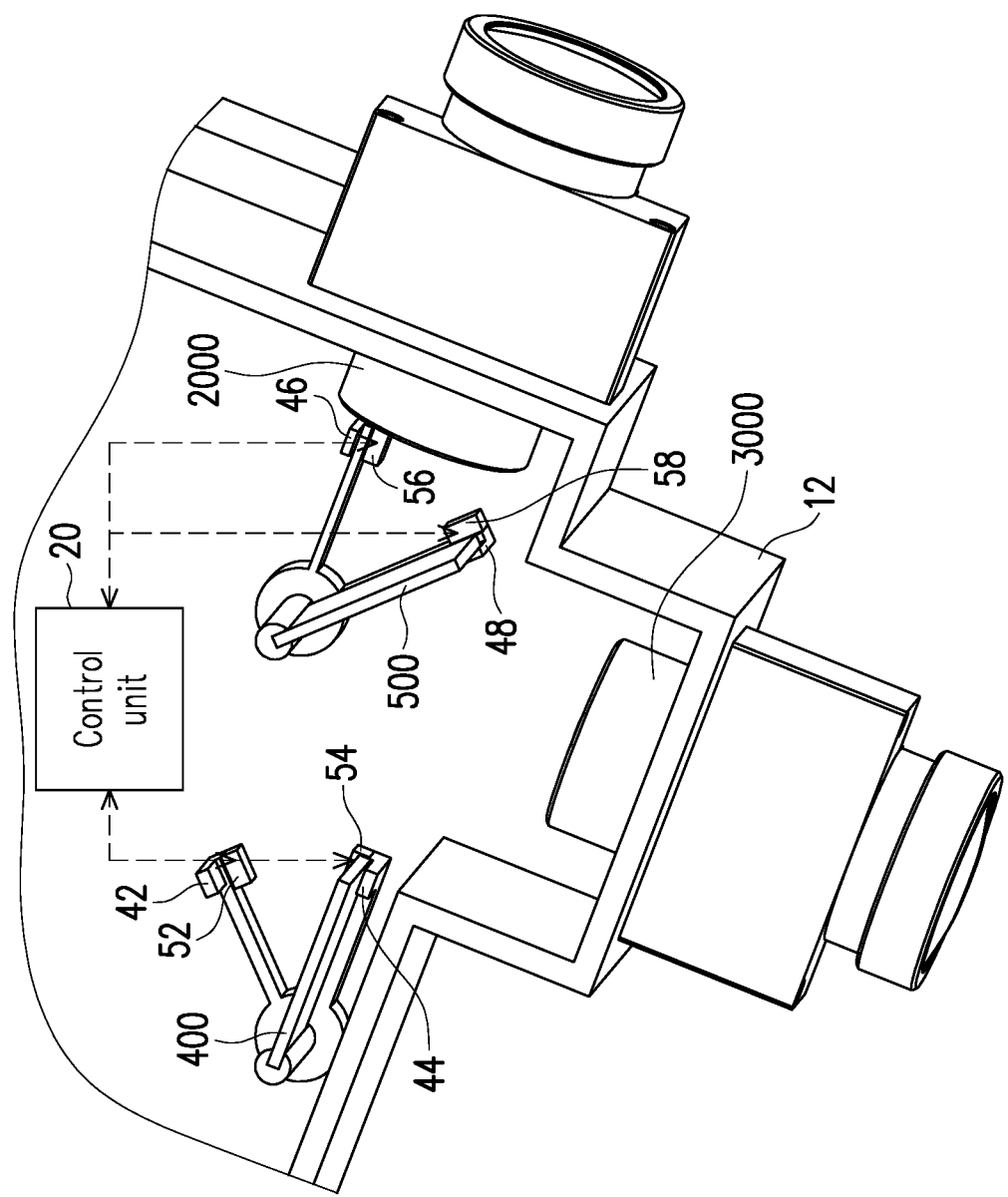
FIG. 5 is a schematic view illustrating a first position sensing element and a second position sensing element detecting a position of the first movable reflector, and a third position sensing element and a fourth position sensing element detecting a position of the second movable reflector.

FIG. 5 is a schematic view illustrating a first position sensing element and a second position sensing element detecting a position of the first movable reflector, and a third position sensing element and a fourth position sensing element detecting a position of the second movable reflector. Referring to FIG. 5, in the embodiment, the projection apparatus 10 further includes a first position sensing element 52 and a second position sensing element 54. The first position sensing element 52 and the second position sensing element 54 may be sensors or touch switches to generate sensing signals. The first position sensing element 52 and the second position sensing element 54 are respectively disposed beside the first stopper 42 and the second stopper 44 and are respectively electrically connected to the control unit 20. The first position sensing element 52 and the second position sensing element 54 are configured to detect a position of the first movable reflector 400. Since the projection apparatus 10 uses the first position sensing element 52 and the second position sensing element 54 to effectively detect the position of the first movable reflector 400, the situation where the position of the first movable reflector 400 is wrong may be avoided.

Based on the above, in an embodiment of the disclosure, the projection apparatus 10 drives the first movable reflector 400 to move through the driving module 30, so that the image light beam IB is projected out of the projection apparatus 10 from the first projection lens 1000 in the first projection mode, and the image light beam IB is projected out of the projection apparatus 10 from the second projection lens 2000 in the second projection mode. The projection direction may be changed without moving the projection apparatus 10, and the lenses with different focal lengths (for example, the first projection lens 1000 and the second projection lens 2000 may have different focal lengths) may also be changed, such as a short-focus wide-angle large-screen lens and a mid-range lens applicable in general meeting rooms may be switched accordingly, so the applicable fields may be increased. Furthermore, the automatic control of the control unit 20 is used to increase the switching speed of the first movable reflector 400, and the projection apparatus 10 may expand an effective projection area of a projected image without reducing the resolution to become an ultra-wide-angle projector.

Besides, the first movable reflector 400 and other elements of the projection apparatus 10 are all disposed within the shell 12, so that precision of each of the elements may be controlled easily. In this way, tolerances that are prone to occur during assembly may be avoided, and the issue that an optical axis (a main light path) of the transmission path of the image light beam IB needs to be readjusted after assembly may be avoided. Each of the elements is disposed within the shell 12, and the size and the cost of the projection apparatus 10 may be further reduced through optimizing the transmission path of the image light beam IB. Furthermore, since the first movable reflector 400 is disposed within the shell 12, dust and dirt affecting the projection quality is less likely to occur, and the first movable reflector 400 may be miniaturized. After the miniaturization of the first movable reflector 400, in addition to reducing the cost and precise control, the elements connected to the first movable reflector 400 (for example, the driving module 30) may also be miniaturized, which facilitates the shortening of an action response time of the first movable reflector 400.

Figure 6:
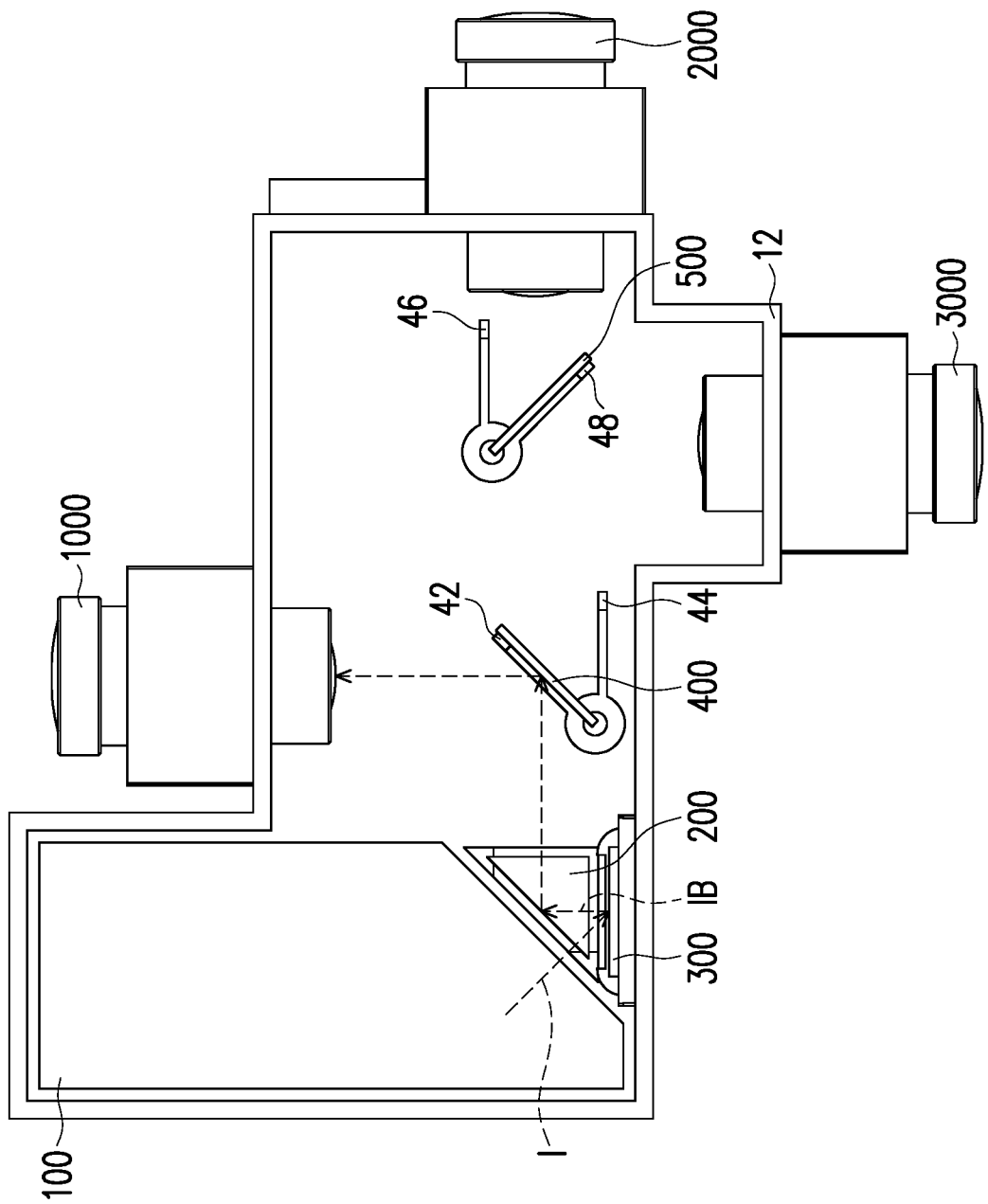
FIG. 6 is a schematic view illustrating a projection apparatus in a first projection mode according to a second embodiment of the disclosure.
Figure 7:
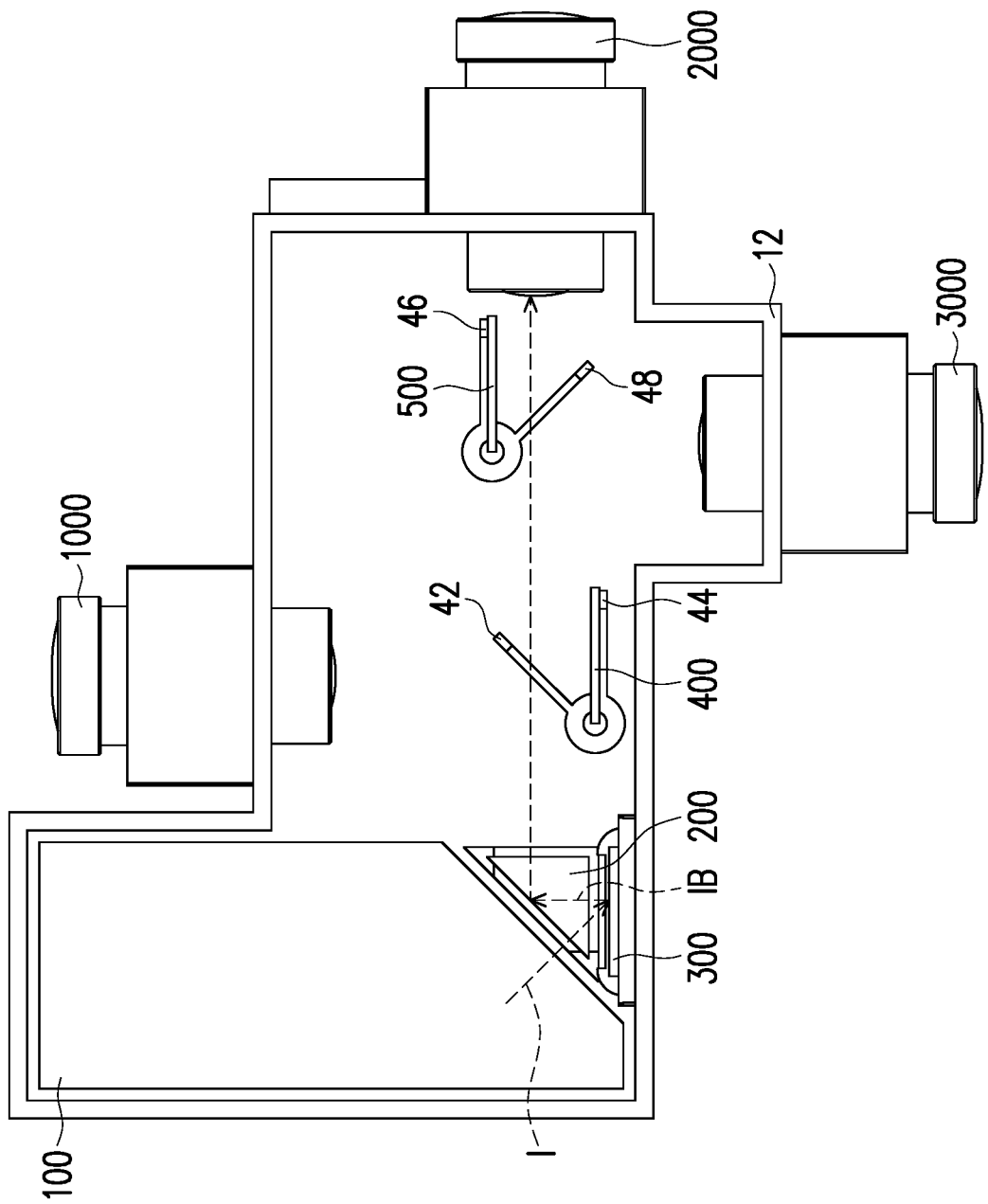
FIG. 7 is a schematic view illustrating the projection apparatus in a second projection mode according to the second embodiment of the disclosure.
Figure 8:
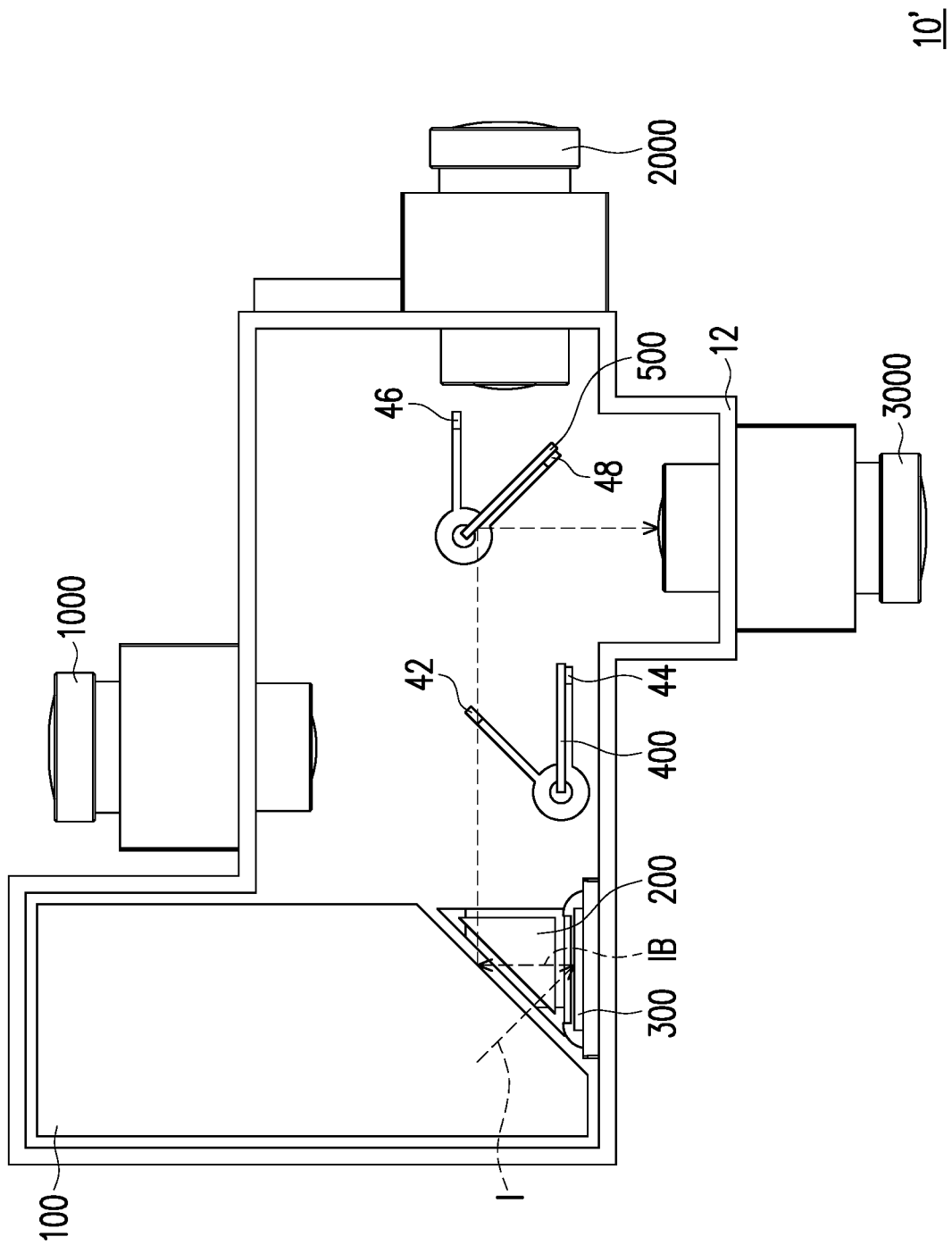
FIG. 8 is a schematic view illustrating the projection apparatus in a third projection mode according to the second embodiment of the disclosure.

FIG. 6 is a schematic view illustrating a projection apparatus in the first projection mode according to a second embodiment of the disclosure. FIG. 7 is a schematic view illustrating the projection apparatus in the second projection mode according to the second embodiment of the disclosure. FIG. 8 is a schematic view illustrating the projection apparatus in a third projection mode according to the second embodiment of the disclosure. Referring to FIG. 6, FIG. 7, and FIG. 8, a projection apparatus 10' is similar to the projection apparatus 10 of FIG. 2, and the main differences are as follows. In the embodiment, the projection apparatus 10' further includes a second movable reflector 500 and a third projection lens 3000. Similarly, the third projection lens 3000 is, for example, the combination of one or more optical lenses with diopter. The optical lens includes, for example, various combinations of non-planar lens, such as the biconcave lens element, the biconvex lens element, the concave-convex lens element, the convex-concave lens element, the plano-convex lens element, and the plano-concave lens element. The configuration and the type of the projection lens 3000 are not limited thereto.

In the embodiment, as shown in FIG. 6, a first projection mode of the projection apparatus 10' is similar to the first projection mode of the projection apparatus 10 in FIG. 2, so there is no repetition here. As shown in FIG. 7, in the second projection mode, the first movable reflector 400 is controlled by the driving module 30 to move to the second position, the second movable reflector 500 is controlled by the driving module 30 to move to a third position, so that the second movable reflector 500 is not located on the transmission path of the image light beam IB. The projection apparatus 10' further has a third projection mode for being performed. As shown in FIG. 8, in the third projection mode, the first movable reflector 400 is controlled by the driving module 30 to move to the second position, so that the first movable reflector 400 is not located on the transmission path of the image light beam IB. The second movable reflector 500 is controlled by the driving module 30 to move to a fourth position. The image light beam IB is transmitted from the light valve 300 to the second movable reflector 500 and is reflected to the third projection lens 3000 by the second movable reflector 500, and is then projected out of the projection apparatus 10'. That is to say, the first projection lens 1000, the second projection lens 2000, and the third projection lens 3000 are respectively disposed on different transmission paths of the image light beam IB.

In the embodiment, the projection apparatus 10' further includes a third stopper 46 and a fourth stopper 48. The third stopper 46 is configured to fix the second movable reflector 500 on the third position. The fourth stopper 48 is configured to fix the second movable reflector 500 on the fourth position.

Referring to FIG. 4, FIG. 7, and FIG. 8 again. In the embodiment, the driving module 30 is further connected to the second movable reflector 500. The second movable reflector 500 is driven to rotate around a second rotation axis R2 through the driving module 30, so that the second movable reflector 500 is located on the third position in the second projection mode and on the fourth position in the third projection mode. The control unit 20 is electrically connected to the driving module 30 and controls the second movable reflector 500 to rotate around the second rotation axis R2 through the driving module 30.

In the embodiment, in the second projection mode, when the second movable reflector 500 is not yet located on the third position, the control unit 20 closes the illumination system 100. In the third projection mode, when the second movable reflector 500 is not yet located on the fourth position, the control unit 20 closes the illumination system 100. Since the projection apparatus 10 uses the control unit 20 to control the illumination system 100 to close the light source, then switches one of the first projection mode, the second projection mode, and the third projection mode, and further controls the movement of the first movable reflector 400 and the second movable reflector 500, the situation of incomplete image display may be avoided.

Referring to FIG. 5 again, in the embodiment, the projection apparatus 10' further includes a third position sensing element 56 and a fourth position sensing element 58. The third position sensing element 56 and the fourth position sensing element 58 may be sensing elements (sensors) or switches. The third position sensing element 56 and the fourth position sensing element 58 are respectively disposed beside the third stopper 46 and the fourth stopper 48 and are respectively electrically connected to the control unit 20. The third position sensing element 56 and the fourth position sensing element 58 are configured to detect a position of the second movable reflector 500. Since the projection apparatus 10' uses the third position sensing element 56 and the fourth position sensing element 58 to effectively detect the position of the second movable reflector 500, the situation where the position of the second movable reflector 500 is wrong may be avoided. Further with the projection apparatus 10', since the projection apparatus 10 uses the control unit 20 to control the illumination system 100 to close the light source, then switches one of the first projection mode, the second projection mode, and the third projection mode, and further controls the movement of the first movable reflector 400 and the second movable reflector 500, the situation of incomplete image display may be avoided. The other merits of the projection apparatus 10' are similar to those of the projection apparatus 10, so there is no repetition here.

Furthermore, in other embodiments, the first projection lens 1000, the second projection lens 2000, and the third projection lens 3000 may be located on different planes. That is to say, the shell 12 has a bottom surface, and the distances between optical axes of the first projection lens 1000, the second projection lens 2000, and the third projection lens 3000 and the bottom surface of the shell 12 are all different. A normal of the bottom surface of the shell 12 is perpendicular to a normal of a reflection surface of the light valve 300, and the optical axes of the first projection lens 1000, the second projection lens 2000, and the third projection lens 3000 are parallel to the normal of the reflection surface of the light valve 300.

In other embodiments, the projection apparatus of the disclosure may also be hung on the ceiling, providing the user with more using options.

In summary of the above, in an embodiment of the disclosure, the projection apparatus drives the first movable reflector to move through the driving module, so that the image light beam is projected out of the projection apparatus from the first projection lens in the first projection mode, and the image light beam is projected out of the projection apparatus from the second projection lens in the second projection mode. Therefore, different projection lenses may be switched with the movable reflector, thereby achieving projection in different directions without moving the projection apparatus or relying on an external mechanism.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising: an illumination system, a light valve, a first movable reflector, a first projection lens, a second projection lens, a control unit, and a driving module, wherein the illumination system is configured to provide an illumination light beam, the light valve is disposed on a transmission path of the illumination light beam and is configured to convert the illumination light beam into an image light beam, and the first projection lens and the second projection lens are disposed on a transmission path of the image light beam and are configured to project the image light beam out the projection apparatus, wherein:

the driving module is connected to the first movable reflector and is configured to drive the first movable reflector to move;

the projection apparatus has a first projection mode and a second projection mode for being performed;

in the first projection mode, the driving module is configured to control the first movable reflector to move to a first position, and the image light beam is transmitted from the light valve to the first movable reflector, the image light beam is reflected to the first projection lens by the first movable reflector, and is projected out of the projection apparatus; and in the second projection mode, the driving module is configured to control the first movable reflector to move to a second position, the first movable reflector is not located on the transmission path of the image light beam, and the image light beam is transmitted from the light valve to the second projection lens and is projected out of the projection apparatus, wherein the control unit is electrically connected to the illumination system and is configured to control the illumination system to emit the illumination light beam; in the first projection mode, when the first movable reflector is not yet located on the first position, the control unit closes the illumination system; and in the second projection mode, when the first movable reflector is not yet located on the second position, the control unit closes the illumination system.

2. The projection apparatus according to claim 1, wherein the first movable reflector is driven to rotate around a first rotation axis through the driving module, the first movable reflector is located on the first position in the first projection mode and is located on the second position in the second projection mode.

3. The projection apparatus according to claim 1, wherein the control unit is further electrically connected to the driving module, and the control unit controls the first movable reflector to rotate around a first rotation axis through the driving module.

4. The projection apparatus according to claim 1, further comprising a first position sensing element and a second position sensing element, wherein the first position sensing element and the second position sensing element are respectively electrically connected to the control unit and are configured to detect a position of the first movable reflector.

5. The projection apparatus according to claim 1, further comprising a control unit, a second movable reflector, and a third projection lens, wherein:

the control unit is electrically connected to the illumination system and is configured to control the illumination system to emit the illumination light beam, the projection apparatus further has a third projection mode for being performed;

in the second projection mode, the driving module controls the second movable reflector to move to a third position, and the second movable reflector is not located on the transmission path of the image light beam; and in the third projection mode, the driving module controls the first movable reflector to move to the second position, the first movable reflector is not located on the transmission path of the image light beam, the driving module controls the second movable reflector to move to a fourth position, and the image light beam is transmitted from the light valve to the second movable reflector, the image light beam is reflected to the third projection lens by the second movable reflector, and is projected out of the projection apparatus.

6. The projection apparatus according to claim 5, further comprising a third stopper and a fourth stopper, wherein the third stopper is configured to fix the second movable reflector on the third position, and the fourth stopper is configured to fix the second movable reflector on the fourth position.

7. The projection apparatus according to claim 5, wherein the driving module is further connected to the second movable reflector, and the second movable reflector is driven to rotate around a second rotation axis through the driving module, the second movable reflector is located on the third position in the second projection mode and is located on the fourth position in the third projection mode.

8. The projection apparatus according to claim 7, wherein the control unit is electrically connected to the driving module, and the control unit controls the second movable reflector to rotate around the second rotation axis through the driving module.

9. The projection apparatus according to claim 5, wherein in the second projection mode, when the second movable reflector is not yet located on the third position, the control unit closes the illumination system; and in the third projection mode, when the second movable reflector is not yet located on the fourth position, the control unit closes the illumination system.

10. The projection apparatus according to claim 5, further comprising a third position sensing element and a fourth position sensing element, wherein the third position sensing element and the fourth position sensing element are respectively electrically connected to the control unit and are configured to detect a position of the second movable reflector.

11. The projection apparatus according to claim 1, further comprising a reflection prism, disposed between the illumination system and the light valve on the transmission path of the illumination light beam, wherein the illumination light beam passes through the reflection prism and is transmitted to the light valve, and the image light beam enters the reflection prism and is reflected to the first projection lens or the second projection lens by the reflection prism.

12. A projection apparatus, comprising: an illumination system, a light valve, a first movable reflector, a first projection lens, a second projection lens, a first stopper, a second stopper, and a driving module, wherein the illumination system is configured to provide an illumination light beam, the light valve is disposed on a transmission path of the illumination light beam and is configured to convert the illumination light beam into an image light beam, and the first projection lens and the second projection lens are disposed on a transmission path of the image light beam and are configured to project the image light beam out the projection apparatus, wherein:

the driving module is connected to the first movable reflector and is configured to drive the first movable reflector to move; the projection apparatus has a first projection mode and a second projection mode for being performed; in the first projection mode, the driving module is configured to control the first movable reflector to move to a first position, and the image light beam is transmitted from the light valve to the first movable reflector, the image light beam is reflected to the first projection lens by the first movable reflector, and is projected out of the projection apparatus; and in the second projection mode, the driving module is configured to control the first movable reflector to move to a second position, the first movable reflector is not located on the transmission path of the image light beam, and the image light beam is transmitted from the light valve to the second projection lens and is projected out of the projection apparatus, wherein the first stopper is configured to fix the first movable reflector on the first position, and the second stopper is configured to fix the first movable reflector on the second position.

* * * * *